Dec. 23, 1947.  W. O. HANCOCK  2,433,215
CULTIVATOR ATTACHMENT
Filed April 3, 1945  2 Sheets-Sheet 1
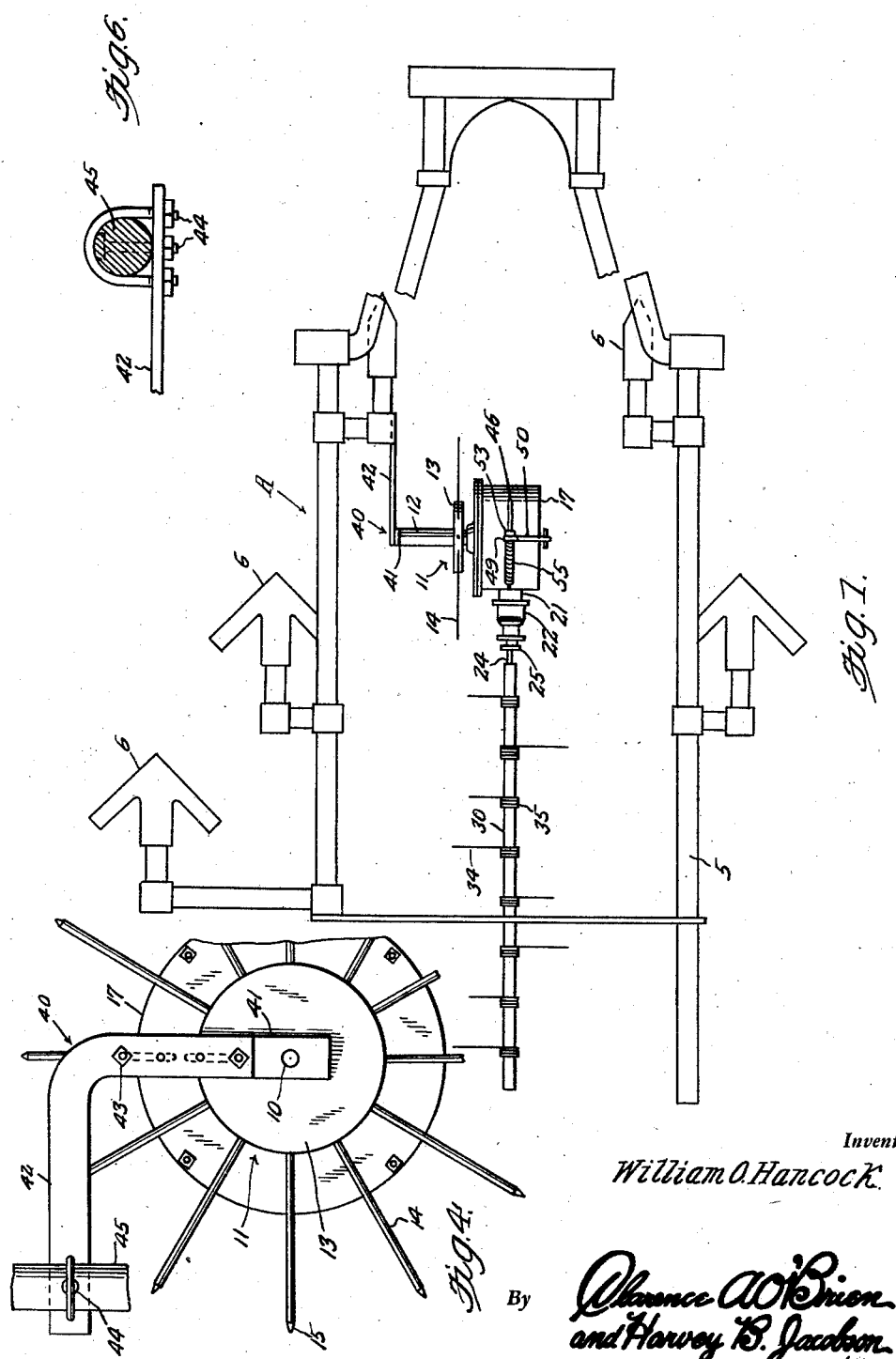
Inventor
William O. Hancock Dec. 23, 1947.                    W. O. HANCOCK                    2,433,215
                                CULTIVATOR ATTACHMENT
                                Filed April 3, 1945                2 Sheets-Sheet 2
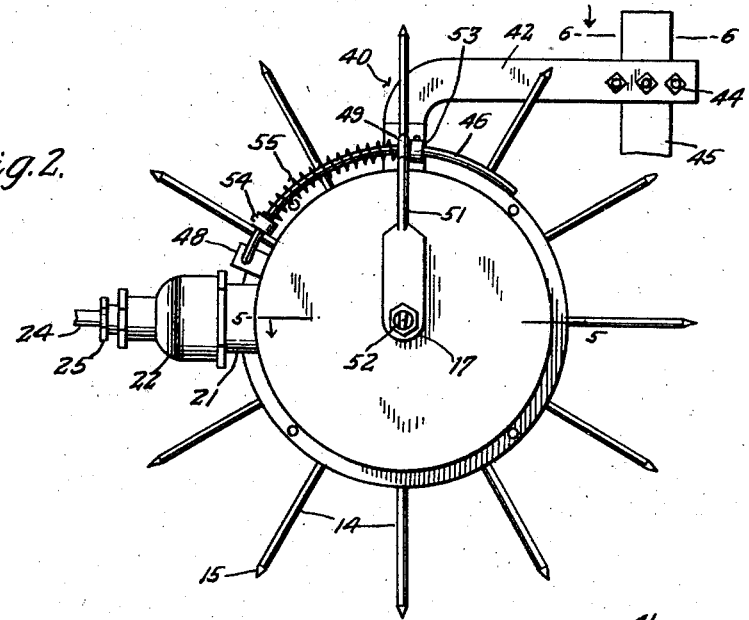
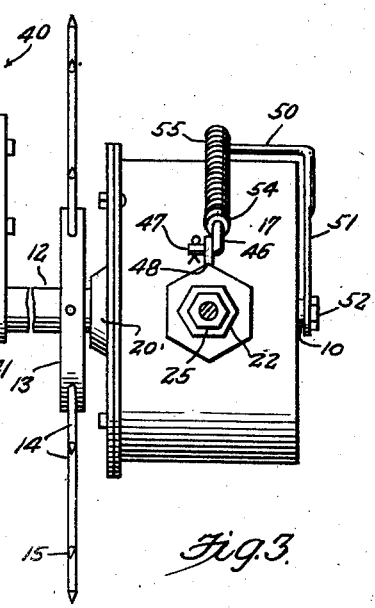
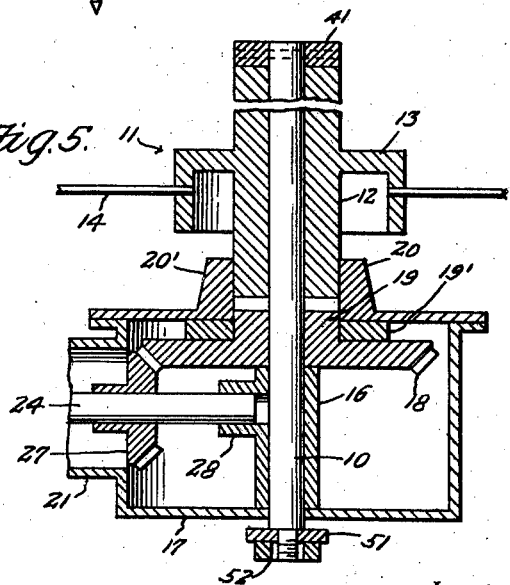
Inventor
William O. Hancock.
By *Clarence A. O'Brien*
and *Harvey B. Jacobson*
Attorneys Patented Dec. 23, 1947

2,433,215

UNITED STATES PATENT OFFICE 2,433,215

CULTIVATOR ATTACHMENT

William O. Hancock, Knoxville, Iowa

Application April 3, 1945, Serial No. 586,298

5 Claims. (Cl. 97—35)

This invention relates to a cultivator attachment of the kind disclosed in my U. S. Letters Patent No. 2,368,136, dated January 30, 1945.

The primary object of the present invention is to provide improved means for mounting the attachment on the cultivator so as to eliminate the rear supporting bracket disclosed in the above-named patent, while at the same time providing for vertical adjustment of the attachment and upward yielding of the earth-working element so that the latter may pass over obstacles and irregularities of the ground surface and avoid damage to or destruction of the earth-working element.

A more specific object is to provide an attaching or mounting means of the above character which is comparatively simple in construction and efficient in use, and which permits attachment of the device to the cultivator with facility and ease.

More specific objects and features of the invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 1 is a fragmentary top plan view showing an attachment constructed in accordance with the present invention and applied to a cultivator unit.

Figure 2 is an enlarged fragmentary side elevational view, showing details of the mounting means for the attachment.

Figure 3 is a view looking toward the right of Figure 2.

Figure 4 is a view somewhat similar to Figure 2, but looking at the opposite side of the attachment.

Figure 5 is a horizontal section taken on line 5—5 of Figure 2.

Figure 6 is a section on line 6—6 of Figure 2.

Referring in detail to the drawings, the present attachment is adapted to be applied to a cultivator unit A which includes a pair of beams 5, each carrying a gang of cultivating shovels or plows 6, one at each side of the row to be cultivated. The present attachment is to be supported between the beams 5 of the cultivator unit, as clearly shown in Figure 1.

The attachment includes a transverse axle 10 having a spiked driving wheel 11 journaled on one end portion thereof, said wheel including a hub 12 provided with a disc body 13 having spikes 14 radiating therefrom at regular or uniform intervals, the outer ends of the spikes being pointed, as at 15. The other end portion of axle 10 is fitted within a tube 16 provided centrally of a gear casing 17, and journaled on the axle 10 at the inner side of tube 16 is a bevel gear 18 having a hub 19 projecting through the inner side of gear casing 17 and journaled in a bearing ring 19' secured to the adjacent side of the gear casing. The adjacent ends of gear hub 19 and wheel hub 12 are interlocked by squared clutch teeth at 20 so that rotation of wheel 11 is imparted to gear 18. The inner end of hub 12 is journaled in a projecting external bearing 20' provided on the inner side of the gear casing 17, so as to brace the axle 10 against lateral strains. Gear casing 17 has an enlarged tubular extension 21 at the rear thereof, and detachably threaded on this extension is a reducer fitting 22 within which is disposed a bearing for a longitudinal shaft 24. A bushing 25 is threaded in the rear end of reducer fitting 22 and engaged with suitable packing so as to prevent leakage of lubricant from the gear casing 17 about the shaft 24. Secured on the shaft 24 within the gear casing 17 is a pinion 27 meshing with bevel gear 18, and the forward end of shaft 24 is journaled in a bearing 28 fixed to and projecting rearwardly from tube 16. It is to be noted that the gear casing 17 is substantially oil-tight, the bearing 19' providing a suitable packing between the bevel gear 18 and the adjacent side of the casing 17 to prevent leakage of oil out of the latter around the hub of gear 18. The tubular extension 23 is of a size to permit rearward passage of the pinion 27 therethrough so that when the fitting 22 is detached from said extension 21, the shaft 24 with its pinion 27 may be removed.

The rear end of shaft 24 is fitted and secured within the forward end of a tubular shaft 30 forming the shaft of an earth-working element. Fixed at suitable intervals longitudinally of the shaft 30 and upon the latter is a series of tangentially extending spring teeth or fingers 34 arranged in spiral or auger fashion about the tubular shaft 30. These teeth or fingers preferably have their inner ends coiled about the shaft 30 and secured against turning thereon, as at 35.

The end of axle 10 at the outer side of wheel hub 12 is carried by the lower end of a vertical bracket 40 including a straight vertical lower section 41 and an upper section 42 of right angular form having a vertical arm overlapped upon and slidably bolted to the section 41, as at 43, so that the section 41 may be vertically adjusted relative to the section 42 for regulating the relationship between the earth-working element and the ground. The horizontal arm of bracket section 42 is securely bolted at 44 to the inner side of the vertical mounting shank 45 for the forward shovel or plow 6 of the gang at one side of the unit A.

Disposed over and adjacent the upper portion of the gear casing 17 concentric with the axle 10 is a longitudinally curved or arcuate rod 46 having a laterally directed rear end 47 pivotally engaged and secured in an ear 48 rigidly provided on the gear casing 17 at the rear of the latter and directly above the extension 21. This rod 46 slidably extends through an eye 49 formed on the free inner end of the upper horizontal arm 50 of an angular guide bracket having a vertical arm 51 whose lower end is fixedly secured on the end of the axle 10 at the outer side of gear casing 17, as at 52. Secured on rod 46 at the forward side of eye 49 is a stop collar 53, while another collar 54 is secured on rod 46 adjacent its pivoted rear end. Collar 54 forms an abutment for the rear end of a helical compression spring 55 disposed on rod 46 and having its forward end abutting the eye 49. Spring 55 yieldingly acts to swing the earth-working element downwardly to a horizontal position, the downward movement of the earth-working element being limited by engagement of the stop collar 53 with the eye 49. Of course, the gear casing 17 turns on axle 10 and rod 46 moves with the gear casing. It will thus be seen that spring 55 yieldingly resists but permits upward swinging of the earth-working element for passing over obstacles and irregularities of the ground surface and thereby avoiding serious damage to or destruction of the earth-working element. As the collar 53 limits downward movement of the earth-working element so as to normally sustain it in a horizontal position, no rear supporting bracket is required for the shaft 30 of the earth-working element. The attachment may be bodily adjusted vertically relative to the ground so as to secure most efficient traction engagement of the spiked wheel with the ground and most effective operation of the spring fingers or teeth 34 between the plants of a row.

In operation, upon forward travel of the cultivator, the spike teeth of the wheel 11 engage the ground so that said wheel is caused to rotate and drive shaft 30 through the gearing 18 and 27. As the shaft 30 rotates, the spring teeth or fingers 34 are caused to successively pass between the plants of a row, effectively stirring the soil around the plants, and removing clods and excess dirt from between the plants so as to uncover those plants which have been covered up in cultivating. The spring nature of the teeth or fingers 34 allows them to yield when striking relatively stationary objects or heavy clods, and the drive wheel takes the place of what is known as a clod finder.

From the foregoing description, it is believed that the construction, operation and advantages of the present invention will be readily understood and appreciated by those skilled in the art. Minor changes may be made in details of construction illustrated and described, such as fall within the spirit and scope of the invention as claimed.

What I claim is:

1. A cultivator attachment of the character described comprising a transverse axle, a gear casing journaled on said axle, a spiked ground-engaging wheel journaled on said axle beside said gear casing, a rotary earth-working element having a longitudinal shaft projecting at its front end into and journaled in the gear casing, said shaft being supported only at said front end, gearing in the gear casing operatively connecting the spiked wheel to said longitudinal shaft, a bracket secured on one end of said axle for mounting the attachment on the cultivator, and means coacting between said gear casing and said axle to limit turning of the gear casing on the axle in a direction such that the earth-working element is prevented from moving downwardly.

2. A cultivator attachment of the character described comprising a transverse axle, a gear casing journaled on said axle, a spiked ground-engaging wheel journaled on said axle beside said gear casing, a rotary earth-working element having a longitudinal shaft projecting at its front end into and journaled in the gear casing, said shaft being supported only at said front end, gearing in the gear casing operatively connecting the spiked wheel to said longitudinal shaft, a bracket secured on one end of said axle for mounting the attachment on the cultivator, and means coacting between said gear casing and said axle to limit turning of the gear casing on the axle in a direction such that the earth-working element is prevented from moving downwardly, and yieldable means to resist turning of the gear casing in the opposite direction and to thereby resist upward movement of the earth-working element.

3. A cultivator attachment of the character described comprising a transverse axle, a gear casing journaled on said axle, a spiked ground-engaging wheel journaled on said axle beside said gear casing, a rotary earth-working element having a longitudinal shaft projecting at its front end into and journaled in the gear casing, said shaft being supported only at said front end, gearing in the gear casing operatively connecting the spiked wheel to said longitudinal shaft, a bracket secured on one end of said axle for mounting the attachment on the cultivator, and means coacting between said gear casing and said axle to limit turning of the gear casing on the axle in a direction such that the earth-working element is prevented from moving downwardly, said bracket including a vertical portion adjustable in length to vary the relation of the spiked wheel and earth-working element to the ground.

4. A cultivator attachment of the character described comprising a transverse axle, a gear casing journaled on said axle, a spiked ground-engaging wheel journaled on said axle beside said gear casing, a rotary earth-working element having a longitudinal shaft projecting at its front end into and journaled in the gear casing, said shaft being supported only at said front end, gearing in the gear casing operatively connecting the spiked wheel to said longitudinal shaft, a bracket secured on one end of said axle for mounting the attachment on the cultivator, a guide bracket mounted on the other end of the axle and including an arm extending inwardly over the top of the gear casing and terminating in an eye, a curved rod pivoted at its rear end to the gear casing at the rear of the latter and slidably extending through said eye, said rod being longitudinally curved and disposed concentric with said axle, an abutment on said rod adjacent its pivoted end, and a helical compression spring on the rod and interposed between the collar and the eye for resisting upward movement of the earth-working element.

5. A cultivator attachment of the character described comprising a transverse axle, a gear casing journaled on said axle, a spiked ground-engaging wheel journaled on said axle beside said gear casing, a rotary earth-working element having a longitudinal shaft projecting at its front end into and journaled in the gear casing, said shaft being supported only at said front end, gearing in the gear casing operatively connecting the spiked wheel to said longitudinal shaft, a bracket secured on one end of said axle for mounting the attachment on the cultivator, a guide bracket mounted on the other end of the axle and including an arm extending inwardly over the top of the gear casing and terminating in an eye, a curved rod pivoted at its rear end to the gear casing at the rear of the latter and slidably extending through said eye, said rod being longitudinally curved and disposed concentric with said axle, an abutment on said rod adjacent its pivoted end, and a helical compression spring on the rod and interposed between the collar and the eye for resisting upward movement of the earth-working element, and a stop collar on the rod engageable with the eye to limit downward movement of the earth-working element.

WILLIAM O. HANCOCK.

REFERENCES CITED

The following references are of record in the file of this patent:

UNITED STATES PATENTS

| Number | Name | Date |
|---|---|---|
| 2,368,136 | Hancock | Jan. 30, 1945 |